United States Patent [19]
Lindgren et al.

[11] 3,982,715
[45] Sept. 28, 1976

[54] ADJUSTABLE TOOL POSITIONING STRUCTURE

[75] Inventors: Kenneth Lindgren; Sten Erlandsson, both of Borlange, Sweden

[73] Assignee: Verkstadsproduktion I Borlange AB, Sweden

[22] Filed: Dec. 16, 1975

[21] Appl. No.: 641,209

[30] Foreign Application Priority Data
Dec. 17, 1974 Sweden............................ 7415823

[52] U.S. Cl..................................... 248/2; 173/43
[51] Int. Cl.$^2$....................... E21C 9/00; E21C 5/08
[58] Field of Search............. 248/2, 16; 173/38, 43, 173/28

[56] References Cited
UNITED STATES PATENTS

| | | | |
|---|---|---|---|
| 3,470,969 | 10/1969 | Arcangeli......................... | 248/16 X |
| 3,664,436 | 5/1972 | Beagan ................................ | 173/43 |
| 3,711,047 | 1/1973 | O'Leary............................... | 248/2 |
| 3,744,574 | 7/1973 | Carley................................ | 173/28 X |

Primary Examiner—J. Franklin Foss
Attorney, Agent, or Firm—Beveridge, DeGrandi, Kline & Lunsford

[57] ABSTRACT

An adjustable tool positioning structure comprising: — a base; a member which is mounted on the base and pivotable in a first plane; a link which at one of its ends is hingedly connected to said member and is pivotable in a plane generally perpendicular to said first plane; an arm which is at one end hingedly connected by means of a joint to the other end of the link and includes, for the adjustment of the arm length, a first element connected with the joint and a second element which is movable relative to said first element; said link and said arm being interconnected such that the arm is pivotable about a pivot axis which is fixed relative to the link; and a tool support which is hingedly connected to the other end of the arm and which includes, for the adjustment of the support length, a first element hingedly connected to the movable element of the arm and a second element movable relative to the last-mentioned first element; said tool support being designed to support a tool so that the longitudinal axis of the tool is generally parallel to the longitudinal axis of the support. Said arm is mounted in the joint and rotatable about its own longitudinal axis such that its axis of rotation and its axis of pivoting intersect in the joint, and the arm and the tool support are so arranged that in any of the positions of rotation of the arm they will lie in a generally common plane which is independent of the relative pivoting position of the arm and the tool support.

3 Claims, 5 Drawing Figures

ADJUSTABLE TOOL POSITIONING STRUCTURE

The present invention relates to an adjustable tool positioning structure comprising: — a base; a member which is mounted on the base and pivotable in a first plane; a link which at one of its ends is hingedly connected to said member and is pivotable in a plane generally perpendicular to said first plane; an arm which is at one end hingedly connected by means of a joint to the other end of the link and includes, for the adjustment of the arm length, a first element connected with the joint and a second element which is movable relative to said first element; said link and said arm being interconnected such that the arm is pivotable about a pivot axis which is fixed relative to the link; and a tool support which is hingedly connected to the other end of the arm and which includes, for the adjustment of the support length, a first element hingedly connected to the movable element of the arm and a second element movable relative to the last-mentioned first element; said tool support being designed to support a tool so that the longitudinal axis of the tool is generally parallel to the longitudinal axis of the support.

Conventional structures for the adjustable positioning of, for instance, drilling equipments for tunnel and like constructions, have certain limitations which render their use complicated. To satisfy the requirements for a wide range of adjustability to various positions these structures have been designed so that, when operating with the tool, they will be subjected to considerable strain and the dimensions of arms, beams, etc., which must be adapted to stand such strain, will therefore be heavy. Accordingly, the total weight of such a structure will be so high that a reduction of it would be most advantageous.

It is therefore an object of the present invention to provide an adjustable tool positioning structure which is flexible and easy to handle and the weight of which is considerably less than that of conventional structures but yet has an unreduced range of adjustability.

This and other objects of the invention are realized with the adjustable positioning structure of the type defined in the above opening statement, wherein the arm is mounted in the joint and rotatable about its own longitudinal axis such that its axis of rotation and its axis of pivoting intersect in the joint, and wherein the arm and the tool support are so arranged that in any of the positions of rotation of the arm they will lie in a generally common plane which is independent of the relative pivoting position of the arm and the tool support.

The invention will now be described in more detail with reference to the accompanying drawings in which.

Figure 1:
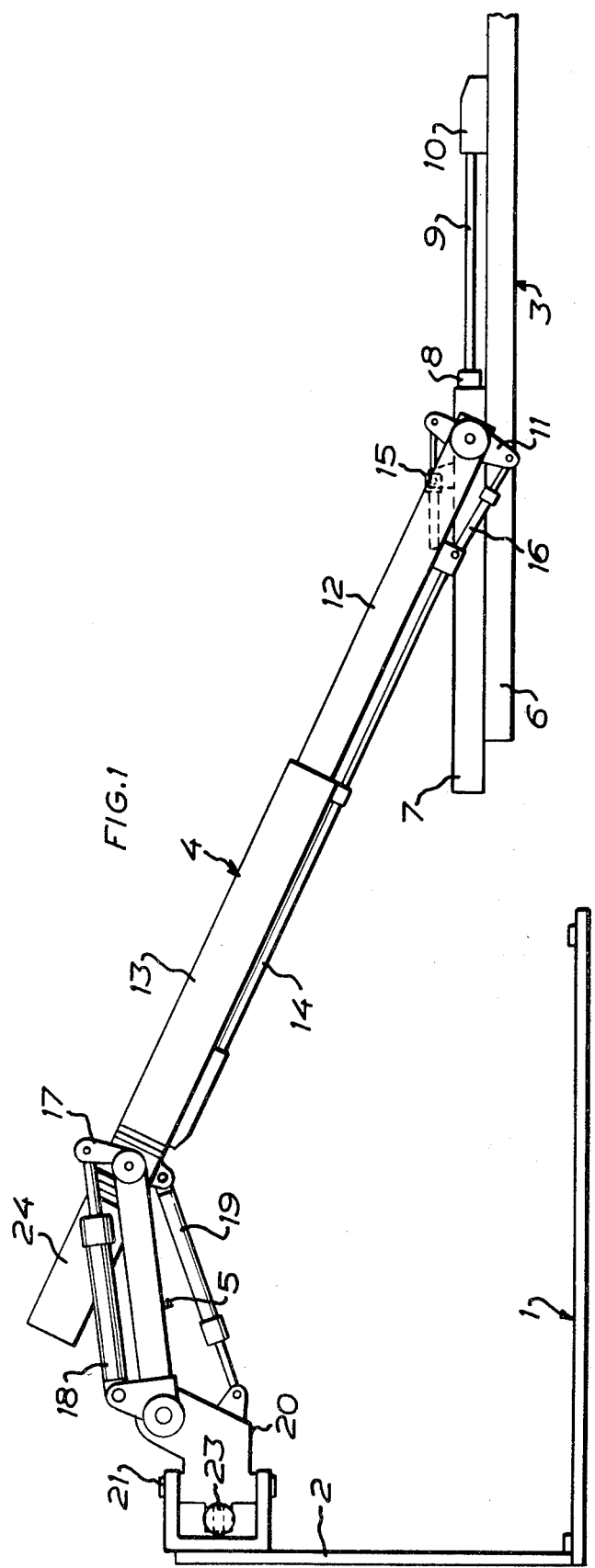
FIG. 1 is a side elevation of the structure of the present invention in a position for operation close to a floor plane.
Figure 2:
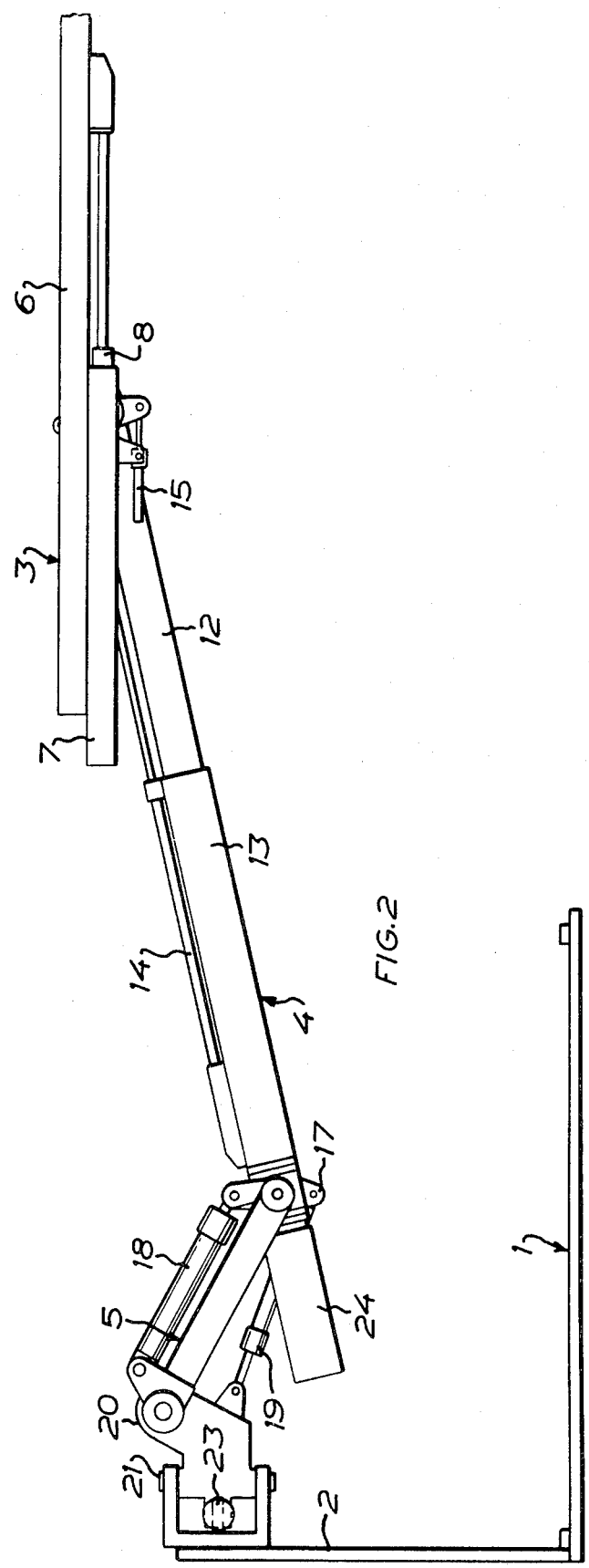
FIG. 2 is a side elevation of the structure of FIG. 1 in a position for operation close to a ceiling plane.
Figure 3:
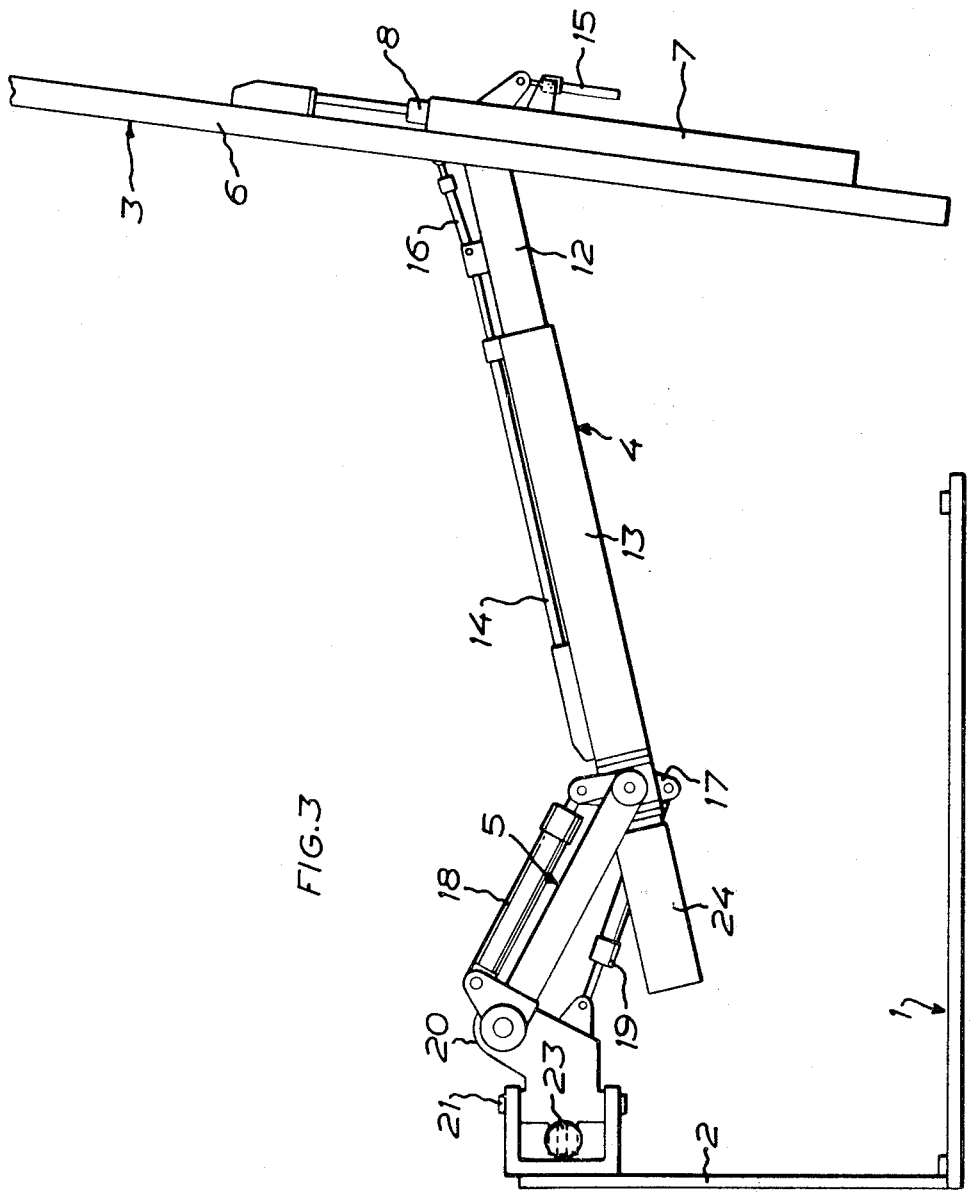
FIG. 3 is a side elevation of the structure of FIGS. 1 and 2 in a further position adapted for vertical operation.
Figure 4:
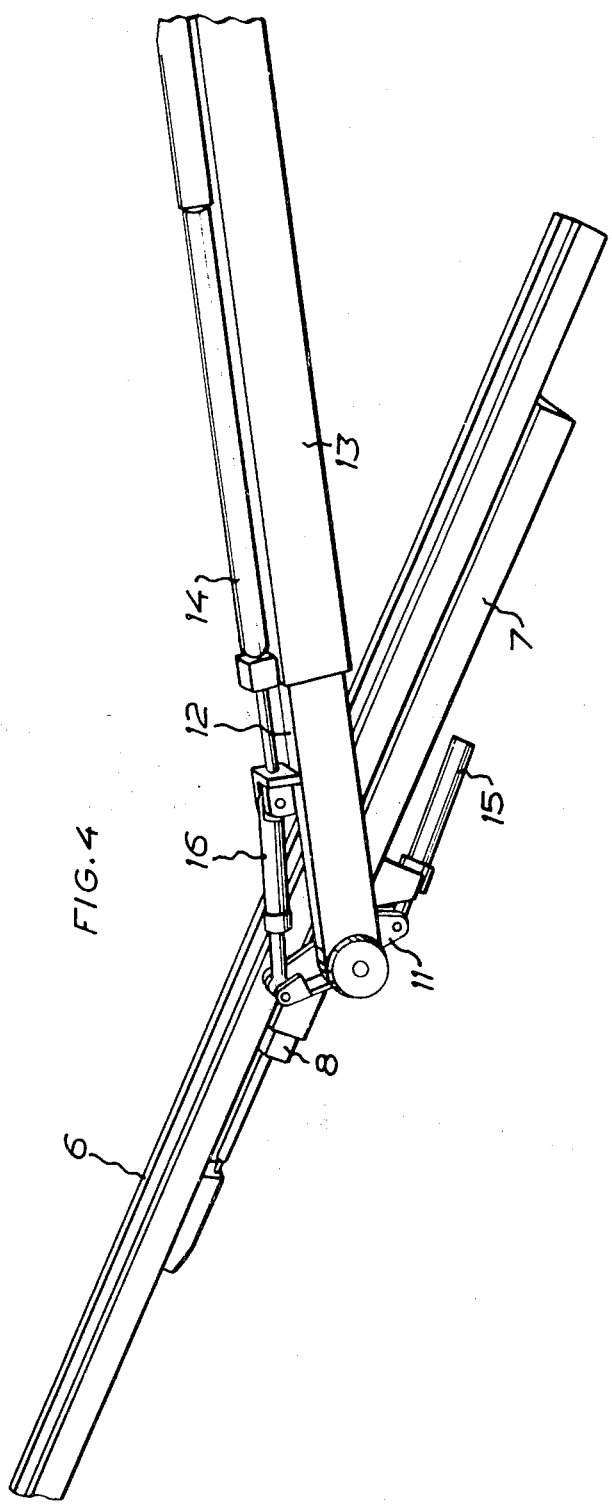
FIG. 4 is a fragmentary side view of the structure of FIGS. 1-3.
Figure 5:
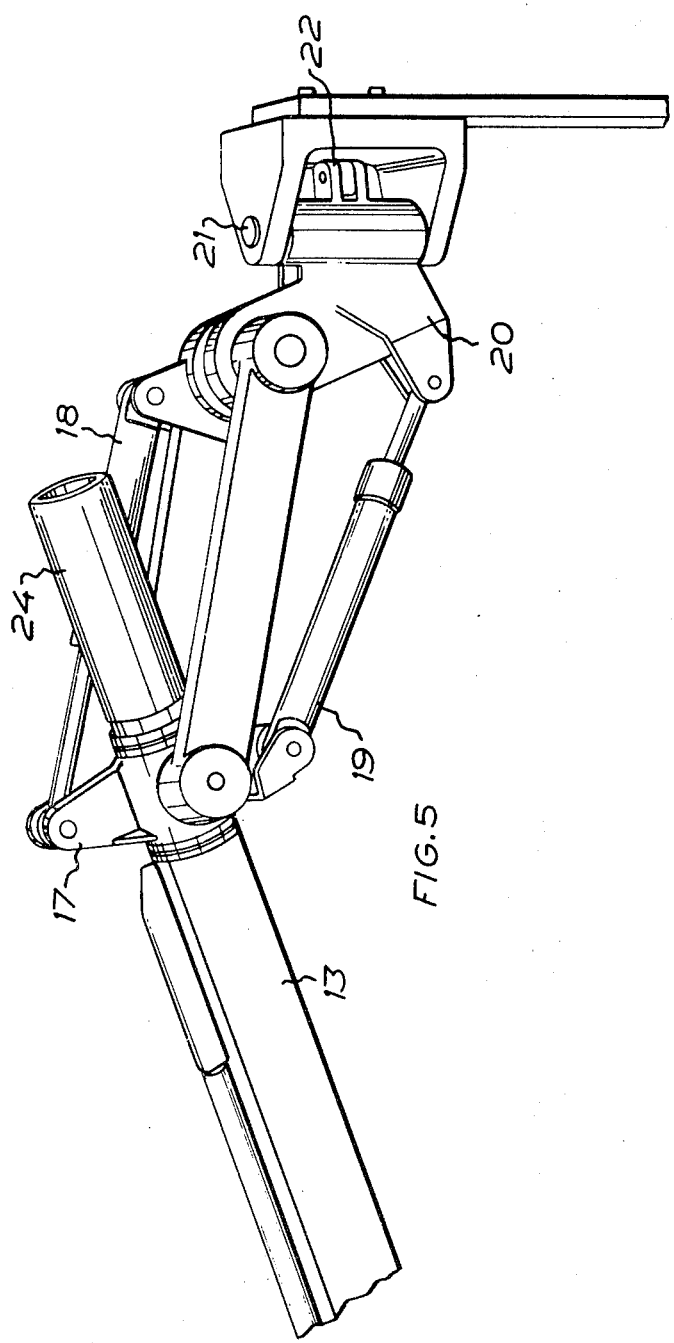

FIG. 5 also is a fragmentary side view of the structure of FIGS. 1-3.

The embodiment of the structure shown in the drawings is only to be regarded as a prototype illustrating the principles of this invention.

Accordingly, all the coupling arrangements required for the adjustment of the various cylinder-piston units included in this structure are left out. Also, the equipment required for the control of said units is not illustrated since these details are all very well known to those skilled in the art and it would thus not involve any problem at all to arrange them in a suitable manner for the proper operation of the structure.

It should be noted that the structure of the invention may suitably be mounted on a frame or base in the form of a caterpillar or wheel driven vehicle which provides the structure with a further latitude of adjustability. In the drawings the base is in the form of a simple pedestal 1 which is made of welded rods. The structure of the invention is fixedly mounted on a vertical rod 2 welded to the pedestal 1.

The structure of this invention, as illustrated in FIGS. 1-5, is principally composed of three main parts, viz. a tool support 3, an arm 4 and a link 5. The tool support 3 is in the form of a rail element 6 and a stationary guide element 7. The rail element 6 is movable relative to the guide element 7 by means of a cylinder-piston unit 8, the end of the piston rod 9 being attached to the rail element at 10 and the cylinder proper 8 being attached to the guide element 7. Also mounted on the stationary guide element 7 is a shaft including a lever 11 the ends of which extend outwardly on either side of the stationary guide element 7. The lever 11 also is pivotally mounted, between its ends, to one end of a movable element 12 included in the arm 4. This element 12 is movable relative to the stationary element 13 of the arm 4 by means of a cylinder-piston unit 14 the piston rod end of which is attached to the movable element 12 and the cylinder of which is attached to the stationary arm element 13.

Arranged between one end of the lever 11 and the stationary guide element 7 is a cylinder-piston unit 15, and arranged between the other end of the lever 11 and the movable arm element 12 is another cylinder-piston unit 16. It should be noted that the piston rod ends of these units are hingedly connected with the lever ends and that the cylinder ends are hingedly connected with the stationary guide element 7 and the movable arm element 12, respectively. As is illustrated in more detail in FIG. 3, however, the leading end of the cylinder of the unit 15 is hingedly connected with the stationary guide element 7 while the tail end of the cylinder of the unit 16 is hingedly connected with the movable arm element 12. In this connection it should also be noted that the lever 11 is to be free to swing relative to the stationary guide element 7, the stationary guide element 7 being pivotally mounted on the same shaft as the lever 11 and the connection between them being established by means of the cylinder-piston unit 15.

The stationary arm element 13 is rotatably mounted in a joint in the form of a lever 17 which, in turn, is pivotally mounted in one end of the link 5. The ends of the lever 17 are each hingedly connected with a cylinder-piston unit 18 and 19, respectively. It should be noted that the cylinder end of the unit 18 is hingedly mounted at the end of the link 5 facing away from the arm 4 while the piston rod end of the unit 18 is pivotally mounted to the end of the lever 17. The cylinder end of the unit 19 is pivotally mounted to the opposite end of the lever 17 while its piston rod end is pivotally mounted to a member 20 which is pivotally mounted on the base 1, 2. The member 20 is pivotally mounted on a shaft 21 and, as is further illustrated in FIG. 5, it has a lug 22 which is pivotally connected to the piston rod end of a cylinder-piston unit 23.

As pointed out in the foregoing, the stationary arm element 13 is rotatable in the lever 17 and its rotational motion may be obtained by means of some suitable type of motor 24. In principle the choice of motor 24 is arbitrary but from considerations of space it should of course be as small as possible.

The operation of the structure described above is very simple, and as it involves no difficlties to the person skilled in the art it is not described herein.

As illustrated in FIG. 1 it is possible to adjust the structure to a position for working very close to a floor plane. FIG. 2 shows how it is adjustable to a position close to a ceiling. As it is possible to rotate the arm 4 by means of the motor 24, the positions shown in FIGS. 1 and 2 can be readily applied to various wall planes. FIG. 3 shows the structure adjusted to a position for vertical working of a ceiling or floor. The structure of the present invention thus permits adjustment to a great variety of positions. As a pure exemplification of the adjustability of the present invention it may be mentioned that the prototype shown in the drawings provides the following possibilities for the various cylinder-piston units. The cylinder-piston unit 23 can turn the member 20 through 30° to the left and 30° to the right. The cylinder-piston unit 18 can turn the lever 17 through 45°, and the cylinder-piston unit 19 can turn the lever 17 through 45°, which makes 90° in total. The motor 24 can rotate the arm 4 through 360° and more, if desired. The cylinder-piston unit 14 can displace the movable arm element 12 1200 mm. The cylinder-piston unit 16 can turn the lever 11 through 90°, and the cylinder-piston unit 15 can turn the lever 11 through 45°. The cylinder-piston unit 8 can displace the rail element 6 1000 mm.

What we claim and desire to secure by Letters Patent is:

1. Adjustable tool positioning structure comprising:— a base; a member which is mounted on the base and pivotable in a first plane; a link which at one of its ends is hingedly connected to said member and is pivotable in a plane generally perpendicular to said first plane; an arm which is at one end hingedly connected by means of a joint to the other end of the link and includes, for the adjustment of the arm length, a first element connected with the joint and a second element which is movable relative to said first element; said link and said arm being interconnected such that the arm is pivotable about a pivot axis which is fixed relative to the link; and a tool support whicih is hingedly connected to the other end of the arm and which includes, for the adjustment of the support length, a first element hingedly connected to the movable element of the arm and a second element movable relative to the last-mentioned first element; said tool support being designed to support a tool so that the longitudinal axis of the tool is generally parallel to the longitudinal axis of the support; wherein the arm is mounted in the joint and rotatable about its own longitudinal axis such that its axis of rotation and its axis of pivoting intersect in the joint, and wherein the arm and the tool support are so arranged that in any of the positions of rotation of the arm they will lie in a generally common plane which is independent of the relative pivoting position of the arm and the tool support.

2. A structure as claimed in claim 1, wherein the element of the tool support which is hingedly connected with the arm is provided with a centrally mounted lever which is pivotally mounted to one end of the movable element of the arm and the ends of which are pivotaly connected each to one element in respectively one of two cylinder-piston units, the other element of the first of said two units being pivotally mounted on the element of the tool support which is hingedly connected with the arm and the other element of the second unit being pivotally mounted to the movable element of the arm.

3. A structure as claimed in claim 1, wherein the joint is in the form of a lever which is pivotally mounted to one end of the link and the ends of which are pivotally connected each to one element in respectively one of two cylinder-piston units, the other element of the first of said two units being pivotally connected to the link and the other element of the second unit being pivotally connected to the member pivotally mounted in the base.

* * * * *